Jan. 16, 1923.
J. G. VINCENT.
HYDROCARBON MOTOR.
ORIGINAL FILED SEPT. 7, 1917.

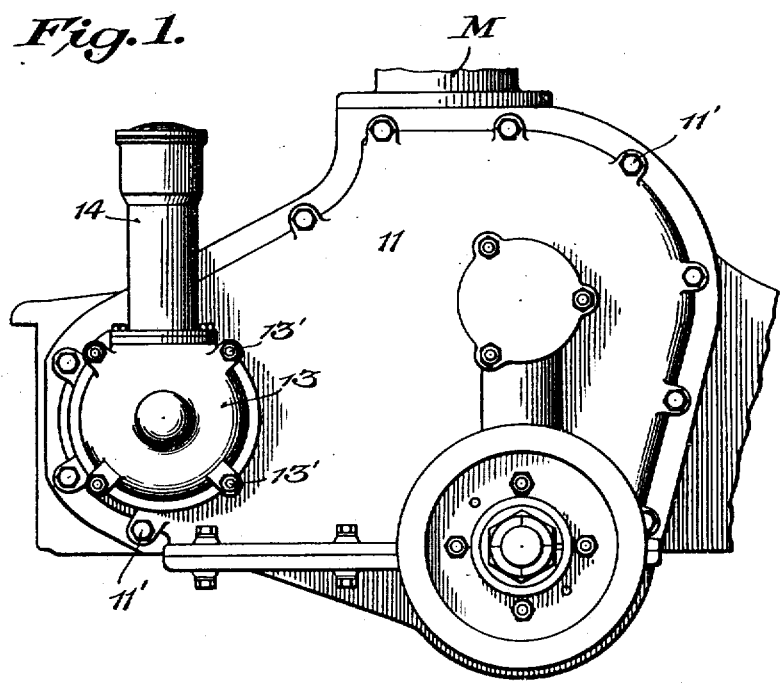
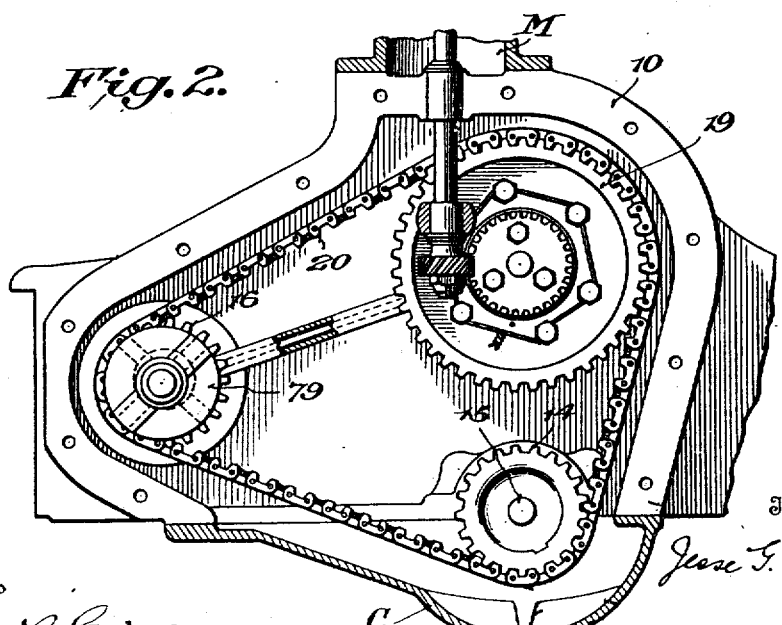

Patented Jan. 16, 1923.

1,442,108

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Original application filed September 7, 1917, Serial No. 190,241. Divided and this application filed July 17, 1919. Serial No. 311,472.

*To all whom it may concern:*

Be it known that I, JESSE G. VINCENT, a citizen of the United States, and residing at Detroit, county of Wayne, State of Michigan, have invented certain new and useful Improvements in Hydrocarbon Motors, of which the following is a specification.

The present application which is a division of my prior application 190,241, filed September 7, 1917, relates to hydrocarbon motors and more particularly to the mounting of the pump and generator and the drive therefor. The principal objects of the invention are to locate the pump in an accessible position such as at the front of the motor; to provide a simple and dependable drive for the pump; to locate the pump so that the drive for the generator also serves to operate the pump; and to provide an easily manipulated adjustment to take up the slack in the chain drive operating the pump and generator shaft. Other objects and features of novelty will be apparent from the description taken in connection with the drawings, in which Fig. 1 is a front elevation of a portion of a hydrocarbon motor embodying the present invention;

Fig. 2 is a similar view with the front cover and pump removed;

Figure 3:
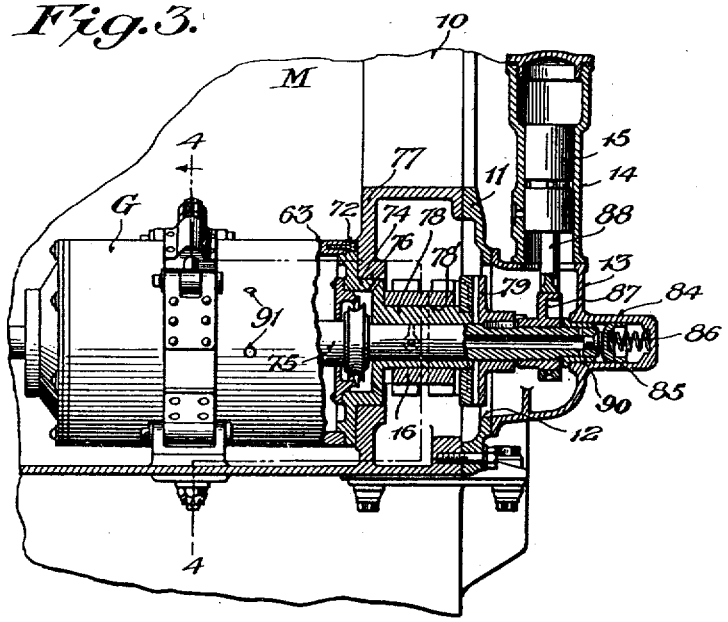
Fig. 3 is a side elevation of a portion of the motor, certain parts being shown in section.
Figure 4:
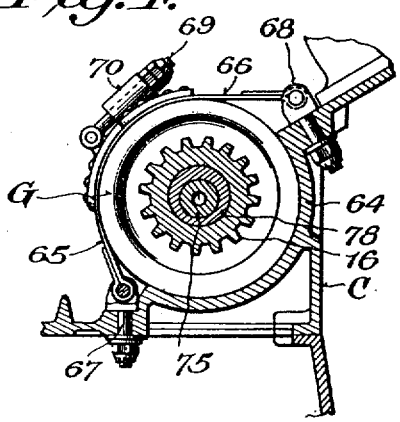
Fig. 4 is a sectional elevation taken substantially on the line 4—4 of Figure 3.

Referring to the drawings the reference numeral 10 indicates a housing arranged at the front of the motor M and enclosing a chain drive which connects the crank, cam, and pump or generator shafts. The front side or cover 11 of this housing is removably secured to the motor in any desired manner, as by means of cap screws 11' and is formed with an aperture 12 through which communication is had with the crank case 13 of a pump, this crank case being secured over the opening 12 in a suitable manner, as by means of the cap screws 13'. In the form of the invention illustrated, this pump is of the reciprocating type and comprises a cylinder 14 secured to the crank case and a piston 15 slidable in the cylinder.

A generator G is mounted at the opposite side of the housing 10. As shown this generator has its casing or frame 63 rotatively supported on a cradle 64 carried by the crank case C of the motor. The cradle is located substantially midway of the length of the generator casing and extends around about 180° thereof. Two straps 65 and 66 have their opposite ends pivotally connected to the cradle as by means of the bolts 67 and 68 respectively. The adjacent ends of the the straps 65 and 66 are connected for adjustment by means of a bolt 69 pivoted to the end of the strap 65 and extending through a lug 70 on the adjacent end of the strap 66, whereby the adjacent ends of the straps are adapted to be pulled toward each other, and thereby clamp the generator against the cradle 64. End plate 72 of the generator which is rigidly secured to the casing 63 is provided with a sleeve 78 which projects into the housing 10 at the front end of the motor. This sleeve consists of a cylindrical portion 74 which is concentric with the generator shaft 75 and is mounted for rotative adjustment in the circular aperture or bearing 76 of the wall 77 of the housing. The sleeve also has a cylindrical portion 78' within the housing, the axis of which is eccentric to the axis of the shaft 75. Mounted on the sleeve is the chain sprocket 16 which is connected to revolve with the shaft 75 as by means of a coupling 79. From the foregoing it is obvious, when the generator casing is adjusted rotatively, the sleeve 78 will be turned thereby moving the axis of the sprocket 16 laterally, thus taking up the slack in the chain around the sprocket.

The crank case 13 of the pump is formed with a hollow boss 84, the bore of which is aligned with the shaft 75, which projects into the crank case and has its end rotatively supported by the bushing 90 in the bore of said boss. A plunger 85 is arranged within the boss 84 and is forced against the end of shaft 75 by means of a spring 86. Intermediate the coupling 79 and the end of the shaft, the latter carries an eccentric 87 which by means of the eccentric rod 88 operates the piston of the pump. Obviously other means might be employed for operating the pump from the shaft 75.

The sprocket 16 is actuated from the crank shaft 15 of the motor, the chain 20 passing around the sprocket 16, the sprocket 14 on the crank shaft and a sprocket 19 secured to the cam shaft.

In order to tighten the chain the straps 65 and 66 are loosened so that the generator casing may be rotatively adjusted by means of a spanner wrench engaging in the holes 91 of the casing. As the eccentric portion 78' of the sleeve is directly connected with the generator casing, this eccentric portion will be rotated, thereby shifting the axis of the chain sprocket 16 laterally and tightening the chain. After the chain has been tightened to the desired degree, the generator may be clamped against this cradle so as to hold the sleeve in this adjusted position. The spring 86 at the end of the shaft acts to hold the parts of the coupling 79 in operative positions.

It will be observed, according to the present invention, the pump is disposed at the front of the motor where it is easily accessible, and may be dismounted without disturbing its drive, or the drive of other parts of the mechanism. Furthermore means is provided for adjusting the tension of the chain which drives the pump.

Although a specific embodiment of the invention has been described in detail, it is to be understood that it is not thus limited, but includes modifications and changes which come within the scope of the appended claims.

Having thus described the invention what I claim as new and desire to secure by Letters Patent is:

1. The combination with a hydrocarbon motor having a housing provided with an opening in one of its walls, of a pump having a case open at one side, means to secure said pump to said housing with the case thereof closing the opening in the housing and the two openings being in communication, a shaft for operating the pump extending from the pump into said housing, bearing means supporting said shaft for rotation about a fixed axis, chain gearing in said housing to rotate said shaft, and means to adjust said gearing.

2. The combination with a hydrocarbon motor having a housing, of a pump removably associated with said housing having a shaft extending into the housing, bearing means supporting said shaft for rotation about a fixed axis, chain gearing in said housing to drive said shaft including a sprocket connected to rotate said shaft, and means to adjust the tension of said chain without disturbing the axis of rotation of said shaft.

3. The combination with a hydrocarbon motor having a housing at one end thereof, an electric generator at one side of said housing, a pump secured to the other side of the housing, the generator shaft having an integral projecting portion extending through the housing and into the pump to operate the same, means within the housing to drive said shaft including a sprocket rotatable with said shaft, a chain and means to adjust the tension of said chain without disturbing the axis of said shaft.

4. The combination with a hydrocarbon motor having a housing, of a generator and a pump disposed on opposite sides of said housing, one of said generator or pump parts having a rotatably adjustable casing provided with a sleeve extending into the housing, a shaft common to said generator and pump extending through said sleeve, the periphery of the sleeve being eccentric to the axis of the shaft, a sprocket rotatably mounted on the sleeve, means connecting the sprocket and shaft for rotation together, and a chain passing around the sprocket to drive the same.

5. The combination with a hydrocarbon motor having a housing, of a generator and a pump disposed on opposite sides of said housing, one of said generator or pump parts having a casing provided with a sleeve extending into the housing, a shaft common to said generator and pump extending through said sleeve, the periphery of the sleeve being eccentric to the axis of the shaft, a bearing concentric with said axis supporting said casing and sleeve for rotative adjustment, a sprocket rotatably mounted on the sleeve, means connecting the sprocket and shaft for rotation together, and a chain passing around the sprocket to drive the same.

6. The combination with a hydrocarbon motor having a housing, of a pump secured to the front of said housing having a shaft extending into the housing, a sleeve surrounding the shaft and supported by the housing for rotatable adjustment around the shaft axis, the periphery of said sleeve being eccentric to said axis, a sprocket rotatably mounted on said sleeve means connecting said sleeve and shaft for rotation, and a chain passing around said sprocket.

7. In combination, a housing, a chain drive in said housing including a sprocket, an electric generator outside said housing having a rotatively adjustable casing and a sleeve extending into the housing, said sleeve having a bearing surface for the said sprocket eccentric to the axis of the casing, and means for securing the casing in adjusted position.

8. In combination, a housing, a chain drive in said housing including a sprocket, an electric generator outside said housing having a rotatively adjustable casing and a sleeve extending into the housing, said sleeve having a bearing surface for the said sprocket eccentric to the axis of the casing, an armature shaft coaxial with the casing extending through the sprocket, driving connections between the sprocket and shaft, and means for securing the casing in adjusted position.

9. In combination, a housing, a chain drive in said housing including a sprocket, an electric generator outside said housing having a rotatively adjustable casing and a sleeve extending into the housing, said sleeve having a bearing surface for the said sprocket eccentric to the axis of the casing, an armature shaft coaxial with the casing extending through the sprocket, an Oldham coupling connecting the shaft and sprocket, a spring coacting with the shaft to hold the coupling parts in operative position and means for securing the sleeve in adjusted position.

10. In combination, a hydrocarbon motor crank case having a housing at the front thereof, a chain drive in said housing including a sprocket, a cradle on the outside of the crank case, an electric generator mounted for rotative adjustment only in said cradle around its axis and having its armature shaft projecting into the said housing and connected to the said sprocket, and means connected with said generator for effecting a lateral shifting of the sprocket to tighten the chain when the generator is turned.

In testimony whereof I affix my my signature.

JESSE G. VINCENT.